United States Patent

Kawahara

[11] Patent Number: 5,804,132
[45] Date of Patent: Sep. 8, 1998

[54] METHOD FOR FIRING CERAMIC PRODUCT

[75] Inventor: Toshinori Kawahara, Fukui, Japan

[73] Assignee: Murata Manufacturing Co., Ltd., Nagaokakyo, Japan

[21] Appl. No.: 821,644

[22] Filed: Mar. 20, 1997

[30] Foreign Application Priority Data

Mar. 22, 1996 [JP] Japan .................................. 8-066454

[51] Int. Cl.⁶ .................................................. C04B 33/32
[52] U.S. Cl. ............................................ 264/671; 264/605
[58] Field of Search ..................................... 264/605, 606, 264/609, 652, 671, 673, 614, 615, 616, 617, 618, 619, 620

[56] References Cited

U.S. PATENT DOCUMENTS

| | | | |
|---|---|---|---|
| 2,948,949 | 8/1960 | Schuffler et al. | 264/605 |
| 4,582,681 | 4/1986 | Asari et al. | 264/605 |
| 5,352,395 | 10/1994 | Kallenbach et al. | 264/673 |
| 5,429,497 | 7/1995 | Yamada et al. | 264/605 |

*Primary Examiner*—Christopher A. Fiorilla
*Attorney, Agent, or Firm*—Burns, Doane, Swecker & Mathis, LLP

[57] ABSTRACT

A method for firing a green ceramic compact including: placing a casing containing a green ceramic compact into a firing tube made of a highly heat-conductive material provided in a furnace so as to substantially close the casing; firing the green ceramic compact; cooling the fired ceramic compact by directly exposing the outer surface of the firing tube; and removing the casing from the firing tube, is described. Also described is a firing apparatus for a green ceramic compact including: a furnace; and a firing tube provided in the furnace with a given space from the side wall of the furnace. The bottom end of the firing tube can be placed on a first stage loaded with a casing containing the green ceramic compact so as to substantially close the casing, the firing tube having a space for firing the green ceramic compact therein and being formed from a highly heat-conductive material.

7 Claims, 3 Drawing Sheets

METHOD FOR FIRING CERAMIC PRODUCT

BACKGROUND OF THE INVENTION

1. Field of the Invention

The present invention relates to a method and apparatus for firing ceramic compacts used in electronic parts.

2. Description of the Related Art

In mass production of ceramic electronic parts and the like, green ceramic compacts are generally fired using a batch firing apparatus 1a such as set forth in FIG. 4. FIG. 4 is a cross-sectional view of the batch firing apparatus 1a, provided with a furnace 2a having a firing space 3a for green ceramic compacts therein. The furnace 2a comprises a furnace wall 4a including a ceiling and a side wall, a stage 10a as a hearth, a heater 5a provided along the furnace wall 4a in the furnace 2a, a gas inlet pipe 6a and a gas outlet pipe 7a provided in the ceiling of the furnace. Further, a lift 9a is provided under the stage 10a for raising and lowering the stage 10a. The furnace 2a is supported by legs 11a.

In the firing process of green ceramic compacts using the firing apparatus 1a, a casing 8a including many green ceramic compacts is put on the stage 10a and placed in the firing space 3a in the furnace 2a. The firing space 3a is heated with the heater 5a to fire the green ceramic compacts while supplying a given gas through the gas inlet and outlet pipes 6a and 7a. After the furnace 2a is cooled to a predetermined temperature, the stage is 10a lowered with the lift 9a to remove the fired ceramic compacts.

Since cooling in the furnace 2a of the ceramic compacts, which is fired at a high temperature, to room temperature requires a long time period, it is proposed in order to achieve faster cooling that the stage 10a be lowered with the lift 9a while the fired ceramic compacts have a high temperature be cooled by direct exposure to the open air.

However, such rapid cooling of fired ceramic compacts results in deterioration and fluctuation of electric characteristics of electronic parts comprising ceramic compacts due to the unstable cooling atmosphere.

SUMMARY OF THE INVENTION

It is an object of the present invention to provide a method and apparatus for firing ceramic compacts in which rapid cooling of fired ceramic compacts can be achieved in a stabilized cooling atmosphere.

In accordance with the present invention, a method for firing a green ceramic compact comprises the steps of: placing a casing containing a green ceramic compact into a firing tube made of a highly heat-conductive material so as to substantially close the casing; firing the green ceramic compact in a furnace; cooling the fired ceramic compact by directly exposing the outer surface of the firing tube to open air; and removing the casing from the firing tube.

In accordance with a second aspect of the present invention, a firing apparatus for a green ceramic compact comprises: a furnace which may be provided with a hearth comprising a first stage and a second stage, each being independently movable; and a firing tube in the furnace with a given space from the side wall of the furnace, the top of said firing tube perhaps being fixed to the ceiling of said furnace, the bottom end of the firing tube capable of being placed on the first stage loaded with a casing containing the green ceramic compact so as to substantially close the casing, the firing tube having a space for firing the green ceramic compact therein and being formed from a highly heat-conductive material.

In accordance with the method and apparatus for firing a ceramic compact of the present invention, cooling of the fired ceramic compact is performed by directly exposing the outer surface of the firing tube to open air after the casing containing the ceramic compact is loaded in the firing tube made of a highly heat-conductive material so as to substantially seal the casing away from open air. In such cooling of the fired ceramic compact, the firing space atmosphere in the firing tube is not disturbed by the open air but after the ceramic compact is fired, the firing tube is, and thus cooling can be stably achieved.

DESCRIPTION OF THE PREFERRED EMBODIMENTS

Figure 1A:
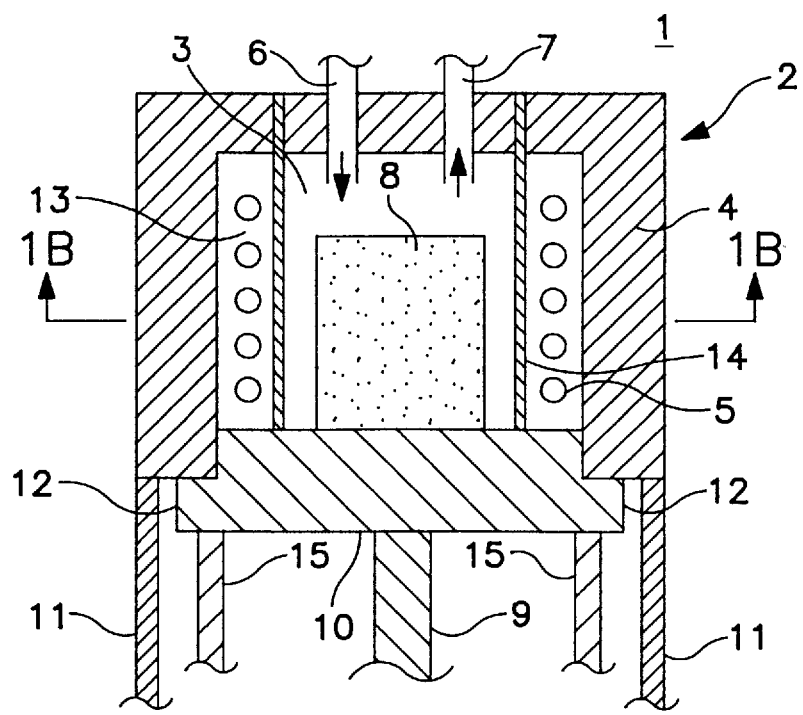
FIG. 1A is a longitudinal sectional view of an apparatus for firing a ceramic compact in accordance with an embodiment of the present invention.

The present invention will now be illustrated with reference to the embodiments set forth in the drawings.

Figure 1B:
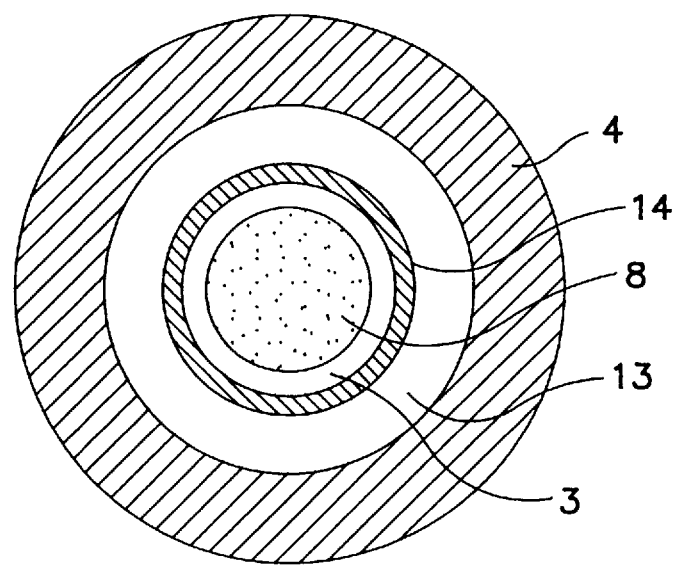
FIG. 1B is a horizontal sectional view taken from line A—A of FIG. 1A.

FIG. 1A is a longitudinal sectional view of a batch firing apparatus 1 as an embodiment in accordance with the present invention, and FIG. 1B is a horizontal sectional view taken from line A—A of FIG. 1B. A heater 5 set forth in FIG. 1A is omitted in FIG. 1B.

The firing apparatus 1 includes a furnace 2 and a firing tube 14 which is provided on the ceiling of the furnace 2 and has a firing space 3 for firing a ceramic compact. The furnace includes a furnace wall 4 including a ceiling and a side wall, a hearth comprising a first stage 10 and a second stage 12, a heater 5 provided in the furnace 4 along the inner firing tube 14, a gas inlet pipe 6 and a gas outlet pipe 7. The first stage 10 is located in the center of the furnace 2 and the second stage 12 is a ring tightly provided along the periphery of the first stage 10 without openings to seal in the heat during a firing. The first and second stages 10 and 12 move independently from each other.

The gas inlet and outlet pipes 6 and 7 are provided in the ceiling of the firing tube 14. The composition of the gas (e.g., a gas selected from N, H, $H_2O$, O, and the like) used depends on what characteristics are desired in the fired ceramic compacts. The firing tube 14 is provided in the furnace 2 so as to have a given space the furnace wall 4 and the side wall of the firing tube 14. The top end of the firing tube 14 is tightly fixed to the ceiling of the furnace 2 by a sealing means. A casing 8 containing a green ceramic compact is loaded on the first stage 10 and is enclosed by the bottom end of the firing tube 14 and the first stage 10 so as to not form a gap between them. The firing tube 14 is formed from a highly heat-conductive material, for example, alumina and silicon carbide. Silicon carbide is preferably used due to its high heat conductivity and high mechanical strength. The first and second stages 10 and 12 of the hearth are provided with lifts 9 and 15 so that the first and second stages 10 and 12 can rise and fall independently of each other. The furnace 2 is supported by legs 11.

Next, a method for firing a green ceramic compact using the apparatus 1 set forth above will be illustrated with reference to FIGS. 1 and 2.

The casing 8 containing many green ceramic compacts is loaded on the first stage 10 and placed in the firing tube 14 in the furnace 2 by means of the lift 9. The casing 8 is thereby enclosed in the firing space 3 in the firing tube 14. The second stage 12 is also raised by means of the lift 15 so as to close the furnace 2. Then, the heater 5 is energized to heat the firing space 3, and a given gas is fed through the gas inlet and outlet pipes 6 and 7 to fire the green ceramic compacts.

Figure 2:
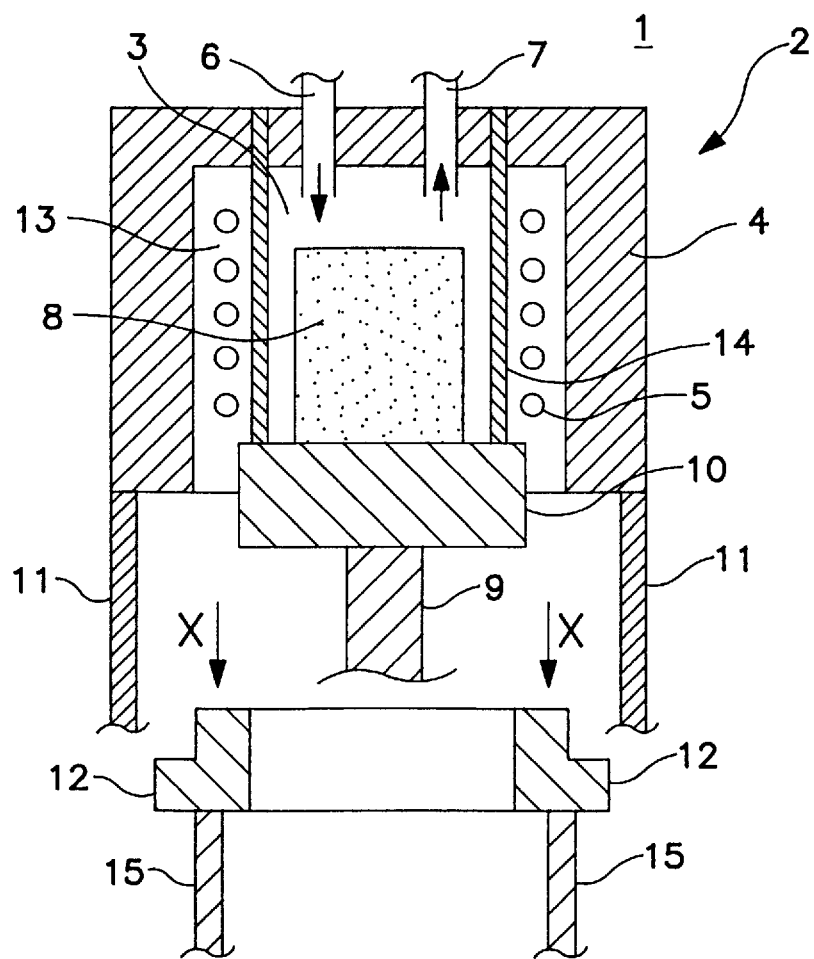
FIG. 2 is a longitudinal sectional view for illustrating the cooling step of the fired ceramic compact in the apparatus set forth in FIG. 1.

After firing, the second stage 12 is lowered along the X direction set forth in FIG. 2 by means of the lift 15 while still enclosing the firing tube 14. The space 13 between the furnace wall 4 and the firing tube 14 is exposed to open air by an opening formed by such movement of the second stage 12 and thus the firing tube 14 is directly exposed to open air. Thus, the fired ceramic compacts, as well as the firing tube 14, are cooled by open air introduced through the opening. In order to shorten the cooling time, cool air may be fed passed the outside of the firing tube 14 with a fan. The fired ceramic compacts are cooled to around room temperature in such a manner.

Figure 3:
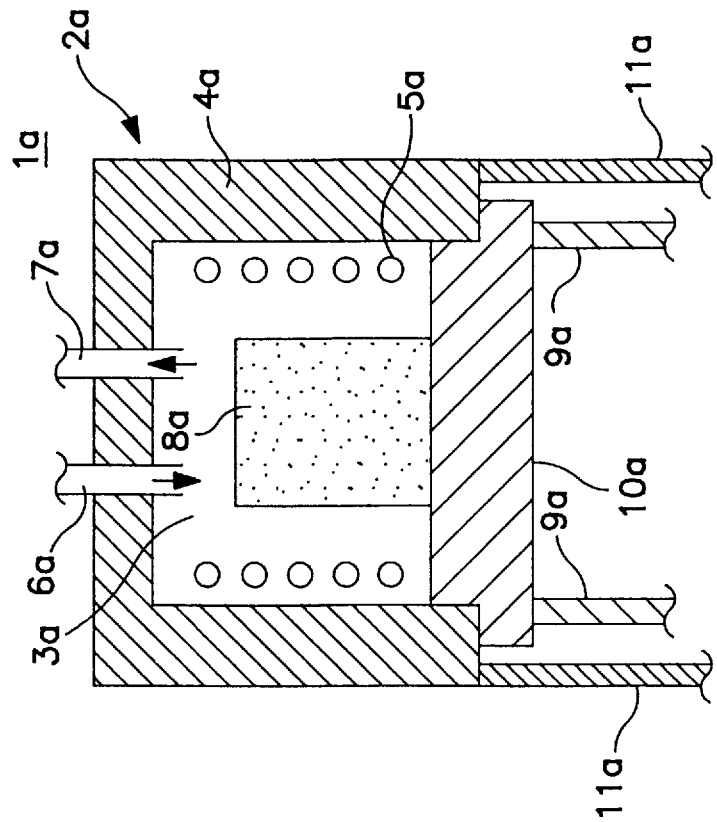
FIG. 3 is a longitudinal sectional view for illustrating the step for removing the fired ceramic compact from the apparatus set forth in FIG. 1.

Then, the first stage 10 is lowered along the X direction set forth in FIG. 3 by means of the lift 9, the casing 8 containing the fired ceramic compacts is unloaded from the first stage 10, and the fired ceramic compacts are removed from the casing 8.

In the method for firing green ceramic compacts, the firing space atmosphere is considerably homogeneous even when open air is introduced in the furnace 2 to rapidly cool the fired ceramic compacts. Thus, electronic parts made of such ceramic compacts exhibit stable and excellent electric characteristics. The firing space 3 in the firing tube 14 may be enclosed to an extent that the atmosphere in the firing space 3 is not disturbed by open air introduction in the furnace 2.

The firing method in accordance with the present invention will be explained in more detail with reference to a monolithic ceramic capacitor of 100 nF capacitance having a length of 1.6 mm, a width of 0.8 mm and a thickness of 0.8 mm. Using the firing apparatus 1 set forth above having a firing tube 14 made of silicon carbide, an alumina casing containing many green ceramic compacts was loaded onto the first stage 10. The green ceramic compacts were fired in the firing tube 14 at a maximum firing temperature of 1,300° C., and then the inside of the furnace 2 was cooled as is. Then, the second stage was lowered to introduce open air into the furnace 2. The fired ceramic compacts were, thereby, cooled from 1,000° C. to room temperature at a cooling rate of approximately 10° C./min. The first stage 10 was lowered, the casing 8 was unloaded from the first stage 10, and the fired ceramic compacts were removed from the casing 8. Monolithic ceramic capacitors were obtained in such a manner.

Figure 4:
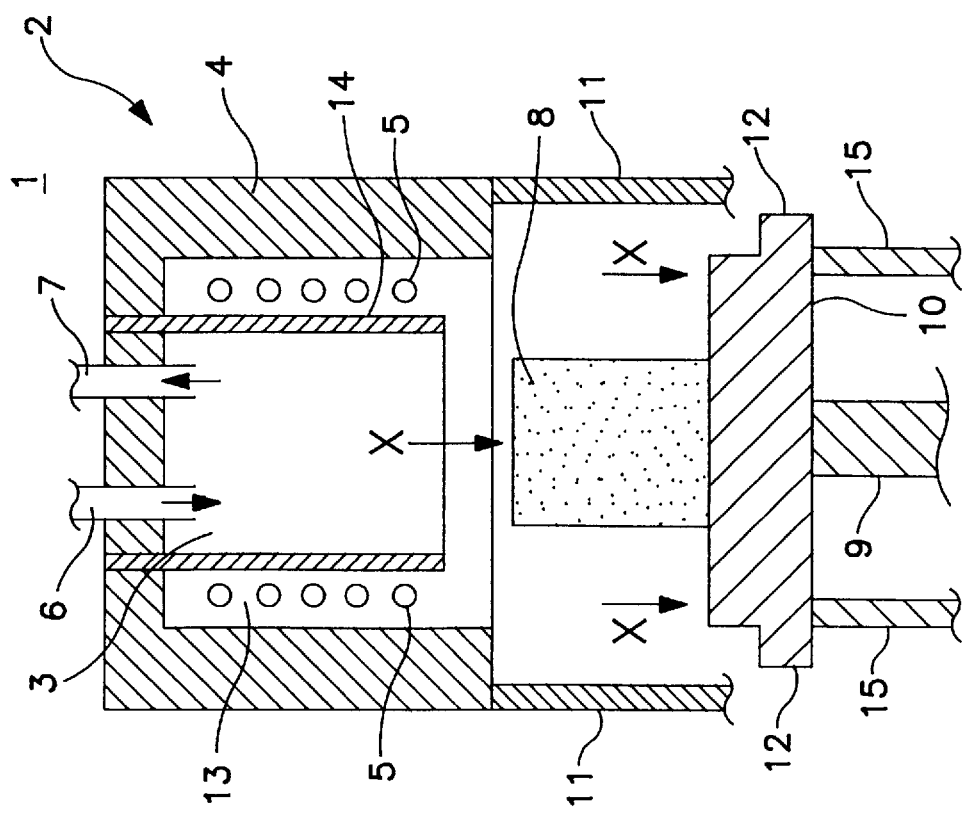
FIG. 4 is a longitudinal sectional view of a prior art apparatus for firing a ceramic compact.

For comparison, green ceramic compacts were fired as in set forth above with the prior art apparatus 1a set forth in FIG. 4, the stage 10a was lowered at a high temperature of 1,000° C. to directly expose the fired ceramic compacts to open air, and the fired ceramic compacts were cooled at a cooling rate of 10° C./min. Prior art monolithic ceramic capacitors were obtained in such a manner.

Each 100 of the monolithic ceramic capacitors obtained by the methods in accordance with the present invention and based on the prior art were subjected to evaluation of change in electrostatic capacitance. As a result, it was found that the monolithic ceramic capacitors obtained from the prior art method have a high change variance (CV) value in electrostatic capacitance of 13.8%, whereas the monolithic ceramic capacitors obtained from the method in accordance with the present invention have a low change variance (CV) value of 4.9%.

Accordingly, the atmosphere of the firing space 3 in the firing tube 14 can be stably and rapidly cooled without disturbance by the open air.

The firing apparatus 1 in accordance with the present invention is not limited to the embodiments set forth above and thus can be modified within the scope of the present invention. For example, although the stage 12 is vertically movable in the embodiments set forth above, a horizontally movable stage may also be used.

The shapes of the furnace and the firing space are not limited to being cylindrical as shown in FIG. 1, and other shapes such as a prism or other rectilinear shapes may be employed. The shape of the firing tube 14 is also not limited to a cylinder, and may be, for example, prismatic or other rectilinear shape. Moreover, the first stage 10 and the second stage 12 are not limited to being circular and a circular ring, and may be, for example, rectangular and a rectangular ring, respectively. The second stage 12 may have an appropriate shape independent of the shape of the first stage 10 as long as the second stage 12 is provided so as to tightly close the casing 8.

Although the casing 8 loaded on the first stage 10 is made of alumina in the embodiments set forth above, other materials such as zirconia may be also used.

Further, the method and apparatus of the present invention are applicable to any ceramic electronic parts formed by firing green ceramic compacts other than monolithic ceramic capacitors.

What is claimed is:

1. A method for firing a green ceramic compact including the steps of:

preparing a furnace which includes a firing tube of highly heat-conductive material;

placing a casing containing a green ceramic compact into said firing tube so as to substantially enclose said casing;

firing said green ceramic compact in the furnace;

cooling the fired ceramic compact by directly exposing the outer surface of said firing tube to open air; and removing said casing from said firing tube.

2. A method in accordance with claim 1, wherein said placing step includes the steps of placing said casing containing a green ceramic compact on a first movable stage and moving said first stage into contact with said firing tube so as to substantially enclose said casing.

3. A method in accordance with claim 2, wherein said removing step further includes the steps of moving said first stage out of contact with said firing tube and removing said casing from said first stage.

4. A method in accordance with claim 1, wherein said firing step includes the step of moving a second stage into contact with walls of said furnace so as to substantially close said casing to open air.

5. A method in accordance with claim 4, wherein said cooling step further includes moving said second stage out of contact with said walls of said furnace to directly expose the outer surface of said firing tube to open air.

6. A method in accordance with claim 1, wherein said removing step further includes the steps of moving a first movable stage out of contact with said firing tube and removing said casing from said first stage.

7. A method for firing a green ceramic compact comprising the steps of:

preparing a furnace including a firing tube made of a highly heat-conductive material;

placing a casing containing a green ceramic compact into the firing tube so as to substantially enclose said casing;

firing said green ceramic compact in the furnace;

cooling the fired ceramic compact by directly exposing the outer surface of said firing tube to open air which is introduced into the furnace by moving a part of the furnace; and removing said casing from said firing tube.

* * * * *

UNITED STATES PATENT AND TRADEMARK OFFICE
CERTIFICATE OF CORRECTION

PATENT NO.   : 5,804,132
DATED        : September 8, 1998
INVENTOR(S)  : Toshinori KAWABARA It is certified that error appears in the above-identified patent and that said Letters Patent is hereby corrected as shown below:

```
Title page, item [54] and col. 1, line 2,
```
    delete "PRODUCT" and insert -- COMPACT --.

Signed and Sealed this

Twenty-ninth Day of December, 1998

Attest:

BRUCE LEHMAN

Attesting Officer

Commissioner of Patents and Trademarks